(12) United States Patent
Schobl

(10) Patent No.: US 6,289,006 B1
(45) Date of Patent: *Sep. 11, 2001

(54) METHOD AND APPARATUS FOR CHANGING CARRIER FREQUENCIES IN EACH TIME SLOT IN A TELECOMMUNICATIONS PROCESS

(75) Inventor: Andreas Schobl, Bochum (DE)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/869,746

(22) Filed: Jun. 5, 1997

(30) Foreign Application Priority Data

Jun. 11, 1996 (DE) ................................................ 196 23 279

(51) Int. Cl.$^7$ ......................................................... H04B 7/00
(52) U.S. Cl. ............................................................ 370/330
(58) Field of Search ..................................... 370/318, 321, 370/337, 343, 344, 347, 330; 375/347, 202

(56) References Cited

U.S. PATENT DOCUMENTS

| 4,606,040 | * | 8/1986 | David et al. ......................... 375/202 |
| 5,282,222 | * | 1/1994 | Fattouche et al. ...................... 375/1 |
| 5,345,448 |   | 9/1994 | Keskitalo ........................... 370/95.3 |
| 5,396,653 |   | 3/1995 | Kivari et al. .......................... 455/88 |
| 5,410,733 |   | 4/1995 | Niva et al. ......................... 455/33.2 |
| 5,430,740 |   | 7/1995 | Kivari et al. ....................... 371/37.1 |
| 5,483,668 |   | 1/1996 | Malkamaki et al. ................ 455/33.2 |
| 5,513,183 | * | 4/1996 | Kay et al. ........................... 370/337 |
| 5,524,009 |   | 6/1996 | Tuutijarvi et al. .................. 370/95.3 |
| 5,570,353 |   | 10/1996 | Keskitalo et al. ..................... 370/18 |
| 5,577,024 |   | 11/1996 | Malkamaki et al. .................. 370/18 |
| 5,606,548 |   | 2/1997 | Vayrynen et al. ................... 370/252 |
| 5,663,957 | * | 9/1997 | Dent ................................... 370/347 |
| 5,687,194 | * | 11/1997 | Paneth et al. ....................... 370/330 |
| 5,719,857 | * | 2/1998 | Heikkinen ........................... 375/202 |

FOREIGN PATENT DOCUMENTS

| 3729586 A1 | 3/1989 | (DE) . |
| 4432928 A1 | 3/1996 | (DE) . |

OTHER PUBLICATIONS

"Struktur des DECT–Standards", Pilger, U., Nachrichtentech., Elektron., Berlin 42, 1992.

\* cited by examiner

Primary Examiner—Chau Nguyen
Assistant Examiner—Jasper Kwoh
(74) Attorney, Agent, or Firm—Perma & Green, LLP

(57) ABSTRACT

The invention relates to a telecommunications process with time division multiple access (TDMA) between a first and a second station, in which process one station transmits and the other receives in at least one predetermined time slot of a frame. In this process, the carrier frequency is changed over in this time slot ($Z_3$) from frame ($R_1$) to frame ($R_2$), in order, in this way, to be able to set up a plurality of transmission channels, using only one time slot. This changing over of the carrier frequency is terminated given fulfilment of an abort criterion.

14 Claims, 4 Drawing Sheets

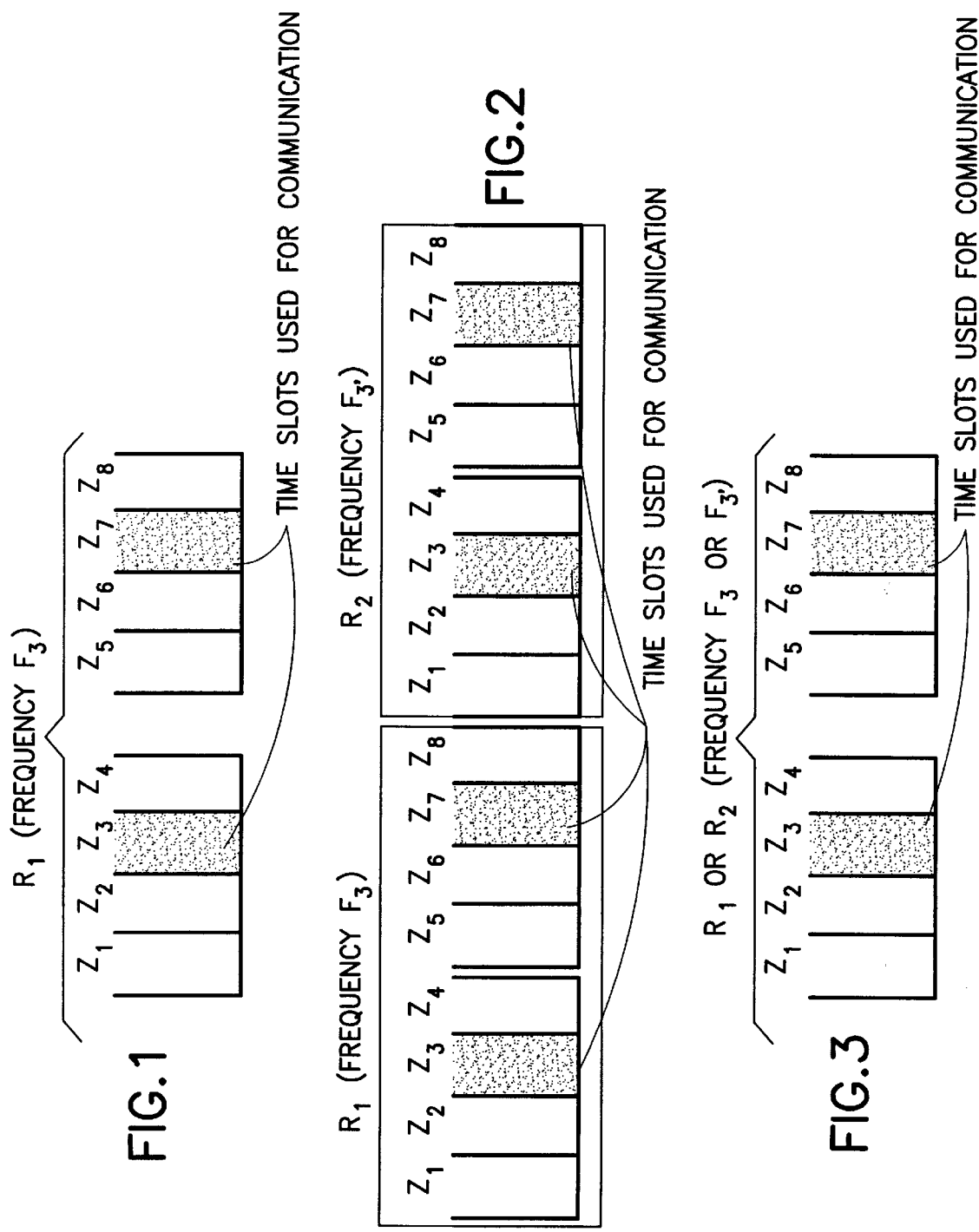

METHOD AND APPARATUS FOR CHANGING CARRIER FREQUENCIES IN EACH TIME SLOT IN A TELECOMMUNICATIONS PROCESS

BACKGROUND OF THE INVENTION

The invention relates to a telecommunications process with time division multiple access (TDMA) between a first and a second station, in which process one station transmits and the other receives in at least one predetermined time slot of a frame.

This process is a telecommunications process with time division multiple access (TDMA) between a first and a second station, in which process one station transmits and the other receives in at least one predetermined time slot of a frame.

In the process with time division multiple access (TDMA), the time axis is subdivided, specifically into frames which are each of the same length and have a predetermined number of bits. For example, each of these frames may be subdivided into an even number of time slots of the same size. The first half of this number of time slots within a frame is used to transmit from the transmitting first station to the receiving second station. This transmission direction is usually referred to as downlink if the first station is a base station and the second station is a mobile station. Accordingly, the second half of the number of time slots within the frame is used to transmit in the opposite transmission direction. Here, the second station transmits while the first station receives. This is usually referred to as uplink if the transmitting station is the mobile station and the receiving station is the base station.

Each of the aforesaid time slots is thus used to set up a transmission channel whose parameters are the number of the time slot within the frame and the carrier frequency used. In order to transmit digital data, the carrier frequency is then frequency-modulated or phase-modulated.

In the European DECT Standard (Digital European Cordless Telecommunications Standard), there are 24 time slots available per frame, specifically 12 in the downlink and 12 in the uplink. In contrast, in the Japanese PHS Standard (Personal Handy Phone System Standard) there are only two times four time slots available per frame, so that the number of time slots per frame is generally not very large.

However, many tasks may require a plurality of transmission channels with different carrier frequencies to be set up. In this case, a plurality of time slots have to be made available per frame in order to carry out the same task, so that, in terms of the number of time slots per frame, a capacity limit is quickly reached. Moreover, if, for reasons of cost, only simple synthesizers are used, the number of usable time slots is reduced further by half since these synthesizers cannot change over from one carrier frequency to another carrier frequency within the very short time period between two time slots.

SUMMARY OF THE INVENTION

The invention is based on the object of developing a telecommunications process of the type mentioned at the beginning in such a way that it permits the number of transmission channels to be increased without simultaneously requiring the use of a larger number of time slots per frame.

The means of achieving the object set is a set of process steps wherein the carrier frequency is changed over in the predetermined time slot from frame ($R_1$) to frame ($R_2$), and this changing over of the carrier frequency is terminated upon fulfillment of an abort criterion.

A telecommunications process according to the invention with time division multiple access (TDMA) between a first and a second station, in which process one station transmits and the other receives in at least one predetermined time slot of a frame, is distinguished in that the carrier frequency is changed over in this time slot from frame to frame and this changing over of the carrier frequency is terminated given fulfilment of an abort criterion.

It is thus possible to use only one time slot to set up two or more transmission channels which operate with different carrier frequencies. In this way, tasks which require the use of different transmission channels with different carrier frequencies can be carried out even if the capacity limit in terms of the number of time slots per frame is reached, for example because, with the exception of one, all the other time slots are already occupied or other time slots are subject to interference, or the like.

Generally, the transmitting stations are capable of detecting when the capacity in terms of the number of time slots per frame is exhausted, so that the process according to the invention does not need to be carried out continuously but is rather used only when for example, with the exception of one, all the other time slots per frame are no longer available for whatever reasons.

The setting up of different transmission channels which relate to the same time slot in successive frames can be carried out, for example, for the purposes of controlling the receiving station if, for this purpose, transmission has to take place at different carrier frequencies. The abort criterion can then be the expiry of a predetermined time. However, it may also be the reception of a message specifying that the changing over of the carrier frequencies be terminated. This message can be transmitted from a third station, for example.

A very advantageous further development of the invention is distinguished in that the first station, in the predetermined time slot, and the second station, in a further predetermined time slot of the same frame, alternately transmit and receive, and in that the carrier frequency in the further predetermined time slot is treated in the same way as that in the predetermined time slot.

In this context, the further predetermined time slot can advantageously be offset by half a frame length with respect to the predetermined time slot.

In this exemplary embodiment, there is a so-called duplex link, which requires two physical channels and which permits the subscribers to speak and listen simultaneously. In the DECT system, a time slot separation is used for duplex links. This is also referred to as Time Division Duplex (TDD). For this, time slot pairs are formed. If the first station, or base station, uses a predetermined time slot for transmission (in the downlink), the second station, or mobile station, transmits (in the uplink) in a time slot which is offset with respect to the first mentioned time slot by half a frame length.

According to the invention, in the case of a capacity bottleneck in terms of the number of available time slots (in the uplink) when using TDD, this second time slot is then also treated in the same way as the time slot in the downlink, which relates to the changing over of frequencies from frame to frame. In other words, when TDD is used, both time slots which are associated with one another are changed over in terms of carrier frequency from frame to frame in the downlink and in the uplink, so that different transmission channels can be set up from frame to frame for both aforesaid time slots.

This may be necessary if, in the uplink and in the downlink, with the exception of one time slot in each case, all the other time slots are occupied or no longer available and, for example, an intracell handover is to occur or a further transmission channel is to be set up. An intracell handover takes place if the radio channel is changed within a cell and thus with the same base station being retained. A reason for carrying out an intracell handover is if the reception level of the base station to which a link is being made at a given time is sufficiently high but the link quality is worsening severely, for example as a result of common channel interference.

Here, too, the abort criterion may be the expiry of a predetermined time. If no transmission channel with a sufficient level of link quality is found within the predetermined time, the link between the two stations may be interrupted. On the other hand, if a good level of link quality is achieved at one of the aforesaid frequencies, the corresponding transmission channel is definitely selected and its carrier frequency set in a stable fashion. The abort criterion would therefore in this case be the achievement of a predetermined level of transmission quality at one of the carrier frequencies. Of course, the abort criterion here may in turn also be the transmission of a message specifying that the changing over of the frequencies be terminated.

In principle, it would be possible, for the purpose of setting up different transmission or radio channels which relate to one time slot each, to change over the carrier frequency between only two frequency values, and specifically at least once, but preferably a plurality of times. In the latter case, a more reliable assessment of the level of link quality is possible. In this exemplary embodiment, two transmission or radio channels could therefore be assigned to one time slot in each case.

In a further development of the invention, the carrier frequency can however also be changed over at least once between more than two frequency values and can be either only increased or only decreased from frame to frame. With respect to a respective time slot, three or more transmission or radio channels could then be set up if required. The frequency changeover cycle, which comprises more than two carrier frequencies, can be repeated periodically here until the corresponding abort criterion has been reached.

BRIEF DESCRIPTION OF THE DRAWING

The invention is described below in more detail with reference to the drawing, in which:

FIG. 1 shows a frame with downlink and uplink with the carrier frequency $F_3$ being used in the time slots 3 and 7;

FIG. 2 shows two successive frames between which the carrier frequency for the time slots 3 and 7 has been changed over from $F_3$ to $F_{3'}$;

FIG. 3 shows a frame with downlink and uplink with the carrier frequency $F_3$ or $F_{3'}$ being used in the time slots 3 and 7;

DETAILED DESCRIPTION OF THE INVENTION

With reference to FIGS. 1 to 3, the principle on which the invention is based will be explained below in more detail with reference to a communication between a base station and a mobile station.

FIG. 1 shows a TDMA frame $R_1$ with four time slots $Z_1$ to $Z_4$ in the downlink and four time slots $Z_5$ to $Z_8$ in the uplink. During the time slot $Z_3$, the base station transmits at the carrier frequency $F_3$, while the mobile station is switched to reception at this time. In contrast, during the time slot $Z_7$ the mobile station is transmitting at the carrier frequency $F_{3'}$, the base station now being switched to reception. $F_3$ is not equal to $F_{3'}$ here.

If, for example, an intracell handover is to take place here, specifically without using time slots other than the time slots $Z_3$ and $Z_7$ which are already in use, the carrier frequency is switched over from $F_3$ to $F_{3'}$ in a frame $R_2$, directly following the frame $R_1$, for the corresponding time slots $Z_3$ and $Z_7$. This changeover can be continued periodically between further successive frames. This is illustrated in FIG. 2.

One of the two stations, preferably the base station, then decides which of the carrier frequencies $F_3$ and $F_{3'}$ used should continue to be used, with a view to the best level of link quality between the two stations. This frequency is then set in a stable fashion. This can be seen in FIG. 3. Here, the communication takes place between the base station and mobile station in time slots $Z_3$ and $Z_7$, that is to say using either the carrier frequency $F_3$ or the carrier frequency $F_{3'}$.

Figure 4:
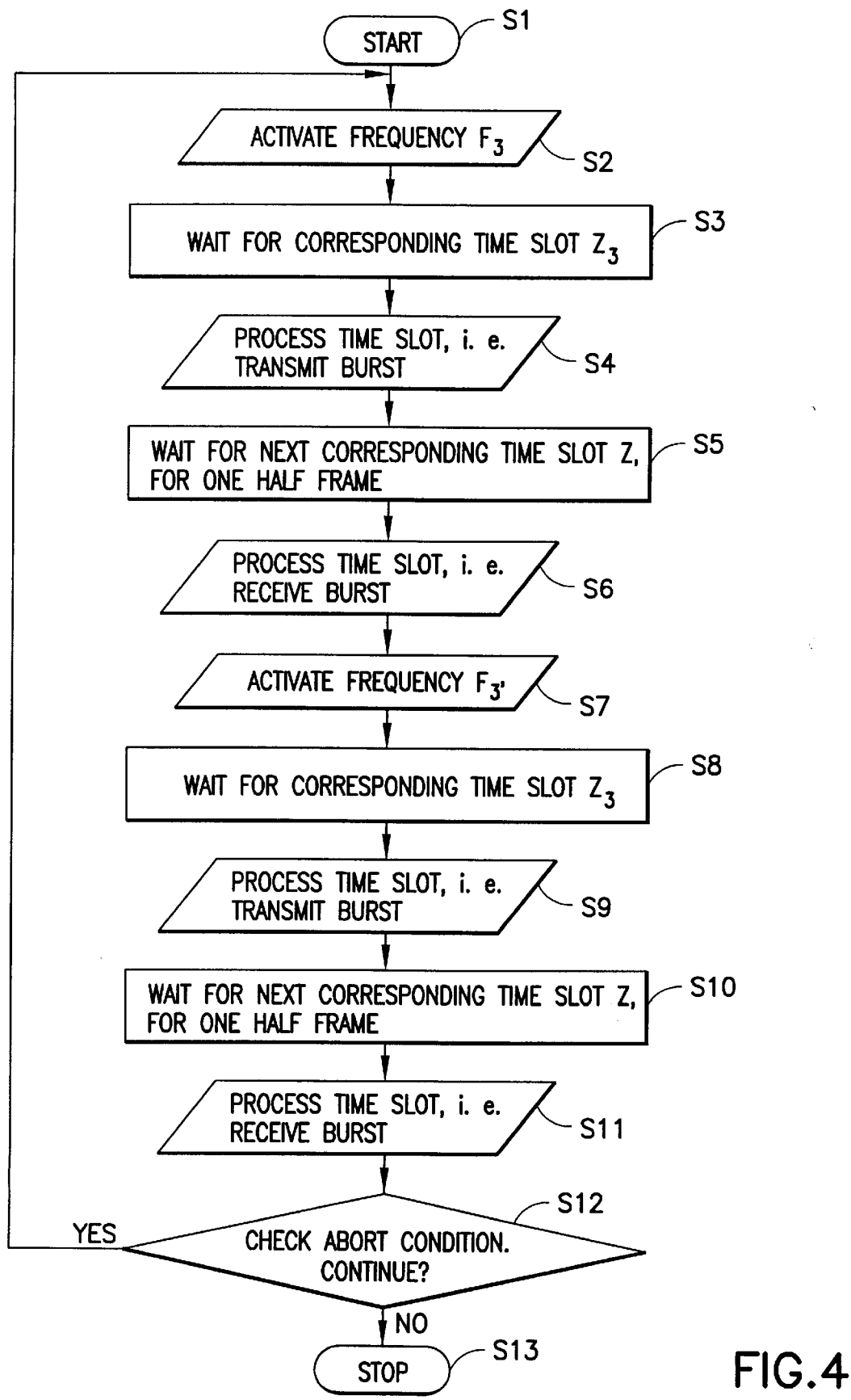
FIG. 4 shows a software implementation of the process described in FIGS. 1 to 3.

A software implementation of the process described in FIGS. 1 to 3 is shown in FIG. 4.

The condition for the occurrence of this procedure is the requirement to set up a new transmission channel. Thus, in step S1 the start of the procedure is achieved. Then, in step S2 the carrier frequency $F_3$ is activated. For the first run through the procedure this is not necessary, but not incorrect either. Then, in step S3, the system waits until the time at which the respective time slot $Z_3$ is active. In step S4, a burst is transmitted during this time slot $Z_3$ at the corresponding frequency, here $F_3$. In the following step S5, the system then waits for the next time slot $Z_7$ which is still in the same frame. Both time slots $Z_3$ and $Z_7$ are separated from one another by half a frame length. In step S6, the system attempts to receive a burst within the relevant time slot $Z_7$.

In the subsequent step S7, the carrier frequency is now changed from $F_3$ to $F_{3'}$. Then, the system successively runs through the steps S8 to S11 which correspond to the steps S3 to S6 but which relate to the new carrier frequency $F_{3'}$.

After the step S11 has been terminated, the abort condition is checked in step S12. This condition determines whether the steps S2 to S11 are run through again, i.e. whether the frequency $F_3$ is activated again in the next frame, and then $F_{3'}$ again, etc.

A condition for exiting from the procedure can be the expiry of a maximum time or else a result which occurs during the procedure, such as the reception of a specific information element at either frequency $F_3$ or $F_{3'}$, for example. This information element can, in terms of the level of link quality, relate to the respective carrier frequencies.

After exiting from the procedure in step S13, one of the two carrier frequencies $F_3$ or $F_{3'}$ must be set again in a stable fashion. Thus, the carrier frequencies are used in the following order:
1. $F_3$—starting frequency
2. $F_3$ and $F_{3'}$ alternating—temporary, virtually simultaneous use of two carrier frequencies
3. $F_3$ or $F_{3'}$—depending on the result of the checking of the abort condition.

Figure 5:
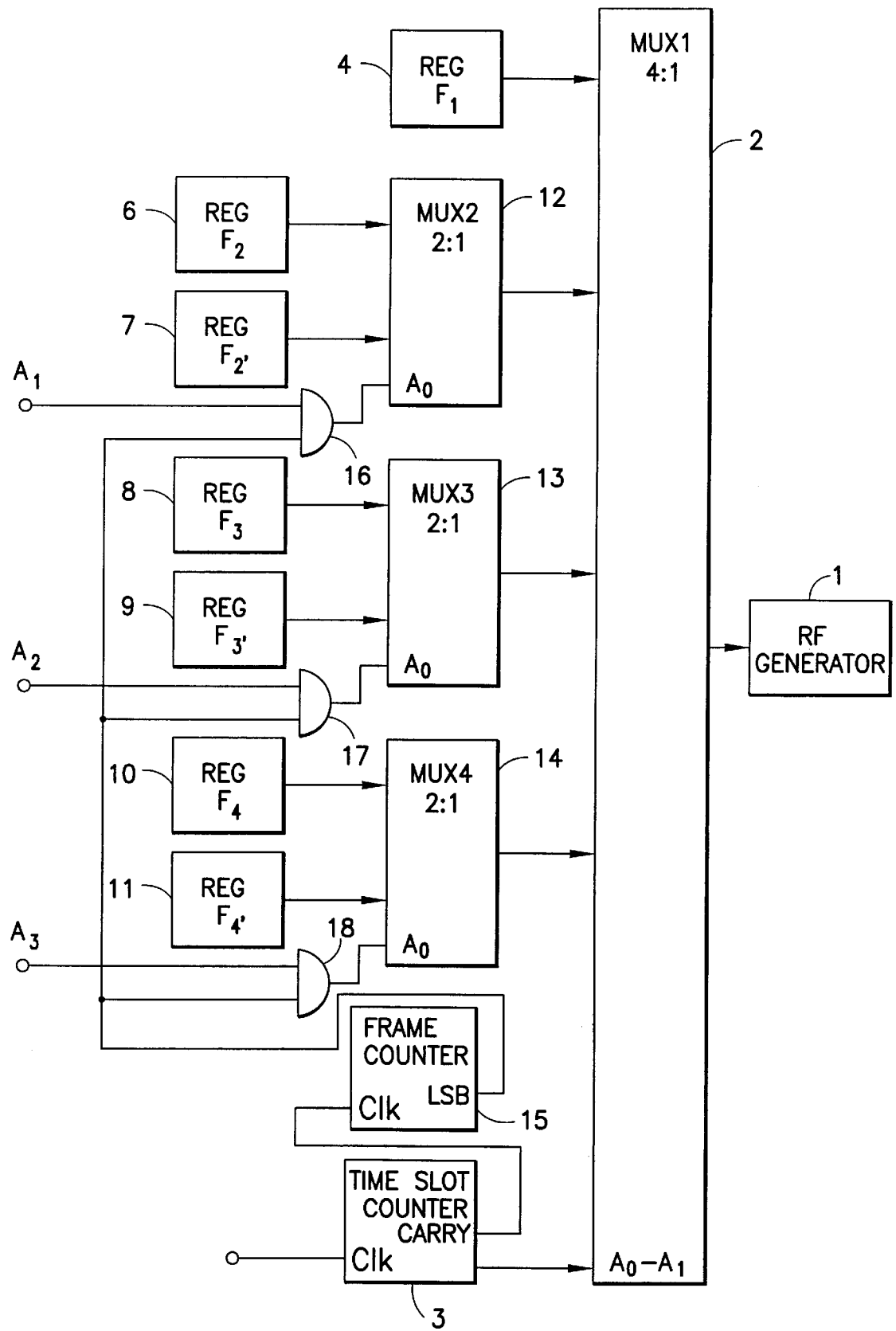
FIG. 5 shows a switching device for changing over the carrier frequency for respective time slots in different frames.

FIG. 5 shows a block circuit diagram of a switching device which permits, in a TDMA frame which comprises four time slots in the downlink and four time slots in the uplink, the frequency in the time slots 2, 3 and 4 to be changed over from frame to frame.

An RF generator 1 receives its control word from the output of a multiplexer 2 (MUX1) whose address lines are controlled by a time slot counter 3. The time slot counter 3 receives clock signals at its input Clk. With each time slot, another input of the multiplexer 2 is therefore connected through to the control input of the RF generator 1. In the present embodiment, a specific input of the multiplexer 2 is thus fed to the input of the RF generator 1 at every fourth time slot.

No alternating frequency or carrier frequency is provided for the time slot 1. Therefore, a register 4, which contains a control word for the RF generator 1 during the first time slot is connected through directly to one of the inputs of the multiplexer 2. The register 4 contains the control word for the carrier frequency $F_1$. In the "00" state of the address lines, this control word then appears at the output of the multiplexer 2.

For the other time slots it shall be possible to change over the carrier frequency at each frame. Therefore, there are two further registers 6, 7 and 8, 9 and 10, 11, respectively, for each of the time slots, which registers contain the control words for the carrier frequencies assigned to the respective time slots. Thus, the control words for the carrier frequencies $F_2$, $F_{2'}$ are stored in the registers 6 and 7, the control words for the carrier frequencies $F_3$, $F_{3'}$ are stored in the registers 8 and 9 and the control words for the carrier frequencies $F_4$, $F_{4'}$ are stored in the registers 10 and 11. A multiplexer 12, 13 and 14 is assigned in each case to a pair of registers 6, 7 and 8, 9 and 10, 11, respectively. Which of the two registers of a pair is connected through to the input of the multiplexer 2 depends on the state of the LSB of a frame counter 15 which is clocked by the carry signal of the time slot counter 3. If the LSB of the frame counter 15 is at LOW, only the respective upper registers in FIG. 5 are connected through, that is to say the registers 5, 6, 8 and 10 in succession. If, in contrast, the LSB (Least Significant Bit) is at HIGH, the respective lower registers are connected through in succession, that is to say the registers 5, 7, 9 and 11. So that the alternating of the carrier frequency can be controlled, the LSB is not connected through directly to the address input of the multiplexers 12, 13 and 14 but rather directed via a gate, as a result of which the procedure can be made possible for each individual time slot. For this purpose, the output of a respective AND gate 16, 17 and 18 is connected to the respective address input $A_0$ of a respective multiplexer 12, 13 and 14. In each case one input of these gates is connected to the output LSB of the frame counter 15 while the respective other input of a respective gate 16, 17 and 18 can receive, via a terminal $A_1$, $A_2$ and $A_3$, an enable signal, assigned to the corresponding time slot, for changing over the carrier frequency. Thus, an enable signal for changing over the frequency in the time slot $Z_2$ arrives at the terminal $A_1$, an enable signal for changing over the frequency in the time slot $Z_3$ arrives at the input $A_2$ and an enable signal for changing over the frequency in the time slot $Z_4$ arrives at the input $A_3$.

It is important that the time slot counter has twice as large a counter range as there are time slots, in order to keep the carrier frequency constant both in the transmission direction and in the reception direction so that the carrier frequency is actually not changed over until the next frame. In the embodiment illustrated, this means counting from 0 to 7 for the time slot counter 3, i.e. not generating a transmission signal for the frame counter 15 until after the eighth time slot although only two address lines are required for addressing the inputs of the multiplexer 2. Therefore, of the usually three outputs of the time slot counter 3, only the two least significant outputs are used. The time slot counter 3 itself is clocked from an internal time base.

The circuit arrangement shown in FIG. 5 is located for example in the base station, while a corresponding circuit arrangement is also present in the mobile station. The latter circuit arrangement performs the frequency change-over in the time slots $Z_5$ to $Z_8$ and is correspondingly synchronized with the first mentioned circuit arrangement.

Figure 6:
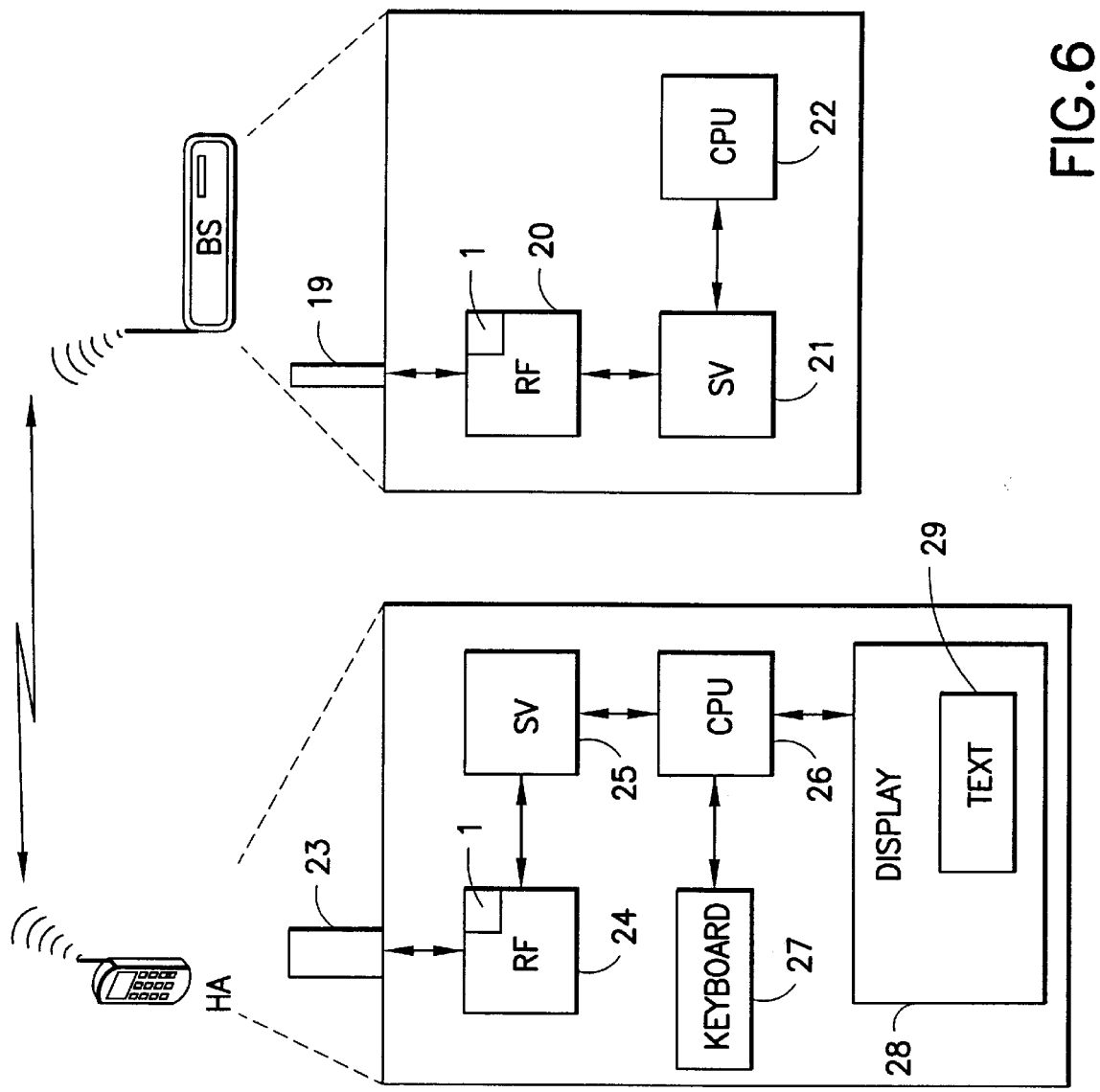
FIG. 6 shows a telecommunications system comprising base station and mobile station.

FIG. 6 also shows the rough design of the base station and mobile station which use the telecommunications process according to the invention.

The base station BS comprises a high-frequency component 20 which is bi-directionally connected to an antenna 19 and is designed to transmit and receive information. This high-frequency component 20 can contain the RF generator 1 shown in FIG. 5. The high-frequency component 20 is also bi-directionally connected to a signal processing circuit 21 which contains, inter alia, the rest of the circuit shown in FIG. 5. Moreover, the signal processing circuit 21 is connected to a processor 22 (CPU) for the operational control of the entire system.

The mobile station which is designed for example as a handheld apparatus HA contains a high-frequency component 24 which is connected to an antenna 23 and is bi-directionally connected to a further signal processing circuit 25. For operational control, this signal processing circuit 25 is bi-directionally connected to a processor 26 (CPU) which itself is bi-directionally connected in each case to a keyboard 27 and to a display 28 which can also contain a field 29 for displaying text. The RF generator 1 shown in FIG. 5 may in turn be located in the high-frequency component 24, while the rest of the circuit arrangement shown in FIG. 5 may be part of the signal processing device 25.

What is claimed is:
1. Telecommunications process with time division multiple access (TDMA) between a first and a second station, in which process one station transmits and the other receives in at least one predetermined time slot of a frame in a sequence of said frames, the process comprising steps of:
   communicating via said sequence of frames between said first and said second stations at a first of a plurality of carrier frequencies during a first frame, a second frame and each of a succession of further frames of said sequence pursuant to a condition of communication;
   observing said condition of communication;
   upon occurrence of a change in said condition of communication, changing a carrier frequency in said time slot from a first carrier frequency in said first frame ($R_1$) to a second carrier frequency in said second frame ($R_2$) for use of differing values of carrier frequency in successive ones of said frames; and
   terminating said changing of the carrier frequency upon fulfillment of an abort criterion.

2. Telecommunications process according to claim 1, wherein the first station, in a predetermined time slot ($Z_3$), and the second station, in a further predetermined time slot ($Z_7$) of either said first or said second frame, alternately transmit and receive, and the carrier frequency in the further predetermined time slot ($Z_7$) is treated in the same way as in the predetermined time slot ($Z_3$).

3. Telecommunications process according to claim 2, wherein the further predetermined time slot ($Z_7$) is offset by half a frame length with respect to the predetermined time slot ($Z_3$).

4. Telecommunications process according to claim 1, wherein the abort criterion is the transmission of a message specifying the terminating of the changing step.

5. Telecommunications process according to claim 1, wherein the abort criterion is the expiry of a predetermined time.

6. Telecommunications process according to claim 2, wherein, the abort criterion is the achievement of a predetermined level of transmission quality at one of the carrier frequencies.

7. Telecommunications process according to claim 6, wherein, upon fulfillment of the abort criterion, communication continues only at said one carrier frequency.

8. Telecommunications process according to claim 1, wherein the carrier frequency is changed over between two frequency values.

9. Telecommunications process according to claim 1, wherein the carrier frequency is changed over at least once between more than two frequency values and is either only increased or only decreased from frame to frame.

10. Telecommunications process according to claim 1, wherein a base station is used as first station and a mobile station as second station.

11. Telecommunication process according to claim 1, wherein in the changing of the carrier frequency, a first value of carrier frequency is maintained in said first frame, a second value of the carrier frequency is maintained in said second frame, and said second frame is adjacent to said first frame.

12. Telecommunications process with time division multiple access (TDMA) between a first and a second station, in which process one station transmits and the other receives in at least one predetermined time slot of a frame in a sequence of said frames, the process comprising steps of:

communicating via the sequence of frames between said first station and said second station at a first of a plurality of carrier frequencies during a first frame, a second frame and each of a succession of further frames of said sequence pursuant to a condition of communication, said condition being an availability of a desired number of communication channels or of a desired signal quality;

observing said condition of communication;

upon occurrence of a change in said condition of communication, wherein said change is an increase in said desired number of communication channels or a decrease is said signal quality, changing the carrier frequency in said second frame from said first carrier frequency to a second of said plurality of carrier frequencies, and providing that said first and said second carrier frequencies are used alternately in successive ones of said frames; and restoring one of said first and said second carrier frequencies in each of said frames of said sequence in response to fulfillment of an abort criterion.

13. Telecommunications process according to claim 12, wherein the carrier frequencies in respective ones of the frames are constant during the respective frames.

14. Telecommunications process with time division multiple access (TDMA) between a first station and a second station, in which process one of said stations transmits and the other of said stations receives in at least one predetermined time slot of a frame in a sequence of said frames, the process comprising steps of:

communicating via said sequence of frames between said first station and said second station with a first of a plurality of carrier frequencies during a first frame, a second frame, and each of a succession of further frames of said sequence pursuant to a condition of communication;

observing said condition of communication;

upon occurrence of a change in said condition of communication, changing the carrier frequency in said second frame from a value of the first carrier frequency used in said first frame to a second of said plurality of carrier frequencies, and using said first and said second carrier frequencies alternately in successive ones of said frames; and restoring one of said first and said second carrier frequencies for use in each of said frames of said sequence upon fulfillment of an abort criterion.

* * * * *